United States Patent [19]

Malyon

[11] 3,809,302

[45] May 7, 1974

[54] INFORMATION RETRIEVAL APPARATUS

[75] Inventor: Brian R. Malyon, Feltham, England

[73] Assignee: Selectro-Micro Company Limited, London, England

[22] Filed: May 8, 1973

[21] Appl. No.: 358,464

[30] Foreign Application Priority Data

May 9, 1972 Great Britain .................... 21476/72

[52] U.S. Cl. .................. 226/33, 226/135, 340/174.1

[51] Int. Cl. ............................................ B65h 23/18

[58] Field of Search ......... 226/33, 9, 132, 129, 133, 226/134, 135, 136; 179/100.2 S; 340/174.1 C

[56] References Cited

UNITED STATES PATENTS 3,572,565 3/1971 Steggall ................................ 226/33

*Primary Examiner*—Richard A. Schacher
*Assistant Examiner*—Gene A. Church
*Attorney, Agent, or Firm*—Mason, Mason & Albright

[57] ABSTRACT

Information retrieval apparatus, particularly for locating a desired frame on a microfilm strip, comprises a photo-electric transducer for detecting the passage therepast of markers on the film strip, each marker being associated with a particular frame, a counter for counting the corresponding signals produced by the transducer, storage means for storing the serial number of a frame to be brought to a reading position, comparing means for continually comparing the count of the counter with the stored serial number, and means for arresting the film movement when the comparison shows equality. The apparatus includes means for slowing the film at a predetermined number of markers before the marker corresponding to a selected frame and means for varying the predetermined number in accordance with the size of the frames on the film strip being used. The apparatus also includes means for selecting from the transducer output a signal representative of the leading edge of the marker, according to the direction of motion of the film, and means operative to halt the film with the transducer located midway between the ends of the selected marker.

11 Claims, 4 Drawing Figures

INFORMATION RETRIEVAL APPARATUS

BACKGROUND OF THE INVENTION

1. Field of the Invention

The present invention relates to information retrieval apparatus for retrieving information from longitudinally movable recording media such as micro-film or tape having information recorded thereon at intervals therealong.

2. Description of the Prior Art

U.S. Pat. No. 3,572,565 in the name of Douglas L. Steggall discloses information retrieval apparatus, for locating a desired frame on a microfilm strip. The apparatus comprises a photo-electric transducer for detecting the passage therepast of markers on the film strip, each marker being associated with a particular frame, a counter for counting the corresponding signals produced by the transducer, storage means for storing the serial number of a frame to be brought to a reading position, comparing means for continually comparing the count of the counter with the stored serial number, and means for arresting the film movement when the comparison shows equality. The storage means also includes means for storing the serial number of the frame initially in the reading position, this number being also fed into the counting means to provide a datum count. The apparatus also includes means for sensing that the desired frame is approaching the reading position and for slowing down the film so as to avoid overshoot when the film is finally arrested. The apparatus can drive the film in either direction to locate the desired frame and, when one desired frame has been located, a further desired frame can be located without having to rewind the film to a datum position.

One of the disadvantages of the prior art apparatus is that since it can home in on a selected frame from either of two opposite directions the datum position which the film adopts when driven from one direction is not precisely the same as that adopted when driven from the opposite direction. This is due to the fact that the marker has a certain thickness and the apparatus is only responsive to whichever edge of the marker is leading according to the direction of movement of the marker.

This discrepancy can be minimised by making the marker very thin but such action would require the transducer to be more sensitive and give rise to the possibility of errors by way of scatches, dust, and the like being picked up by the transducer as markers.

It is an object of the invention to obviate this discrepancy and to ensure that a selected frame is halted in the same position regardless of the direction of approach of the frame to the position.

A further disadvantage of the prior art apparatus is that it can only satisfactorily deal with micro films having a predetermined frame size. The slowing down period for the film as it approaches a selected frame is predetermined by a number stored in a store for the purpose. This number is added to the count in the counter so that the comparing means will sense an equality at a point before the selected film frame reaches its destination. This triggers a deceleration mechanism and the film is finally halted after a further count equal to the predetermined number has been made. If a film having a smaller frame size than that for which the apparatus was designed is used, the repetition rate of the markers as the film is driven will be higher than that for a normal film. Accordingly, the deceleration period for the film will be inadequate and the desired frame will overshoot its destination.

If on the other hand a film having a larger frame size than that for which the apparatus was designed is used, the deceleration period for the film will be increased and accordingly the selected film frame will take considerably longer in reaching its destination and so waste time.

It is another object of the invention to overcome this disadvantage.

SUMMARY OF THE INVENTION

According to the present invention there is provided in apparatus having a transport mechanism for driving, along a predetermined path, a longitudinally movable recording medium having a plurality of longitudinally arranged areas in which information can be recorded and a respective marker associated with each area, and transducer means arranged to produce a respective electrical signal in response to the movement of each marker therepast, each electrical signal comprising first and second time-displaced portions respectively produced by longitudinally-spaced regions of each marker, a control system comprising storage means operative to store an identifying number identifying a particular desired marker which is to be positioned, by appropriate movement of the recording medium along the said path, in a reference position in the path, counting means connected to the transducer means to count the leading said portion only of each electrical signal produced by the transducer means according to the direction of movement of the film, comparing means connected to the counting means and the storage means and operative to compare the instantaneous count of the counting means with the said identifying number in the storage means whereby to produce a control signal when the instantaneous count corresponds with the identifying number, control means responsive to the control signal to produce a transport mechanism arresting signal when the leading portion of the particular desired marker is sensed by the counting means, and delay means for delaying the application of the transport mechanism arresting signal to the transport mechanism by a period related to the width of the marker and the speed of the medium whereby to halt the medium in a position in which the transducer means lies midway between the two portions of the selected marker and which position corresponds to said reference position.

According to the present invention there is further provided in apparatus having a transport mechanism for driving, along a predetermined path, a longitudinally movable recording medium having a plurality of longitudinally arranged areas in which information can be recorded and a respective marker associated with each area, and transducer means adjacent the said path and producing a respective electrical signal in response to the movement of each marker therepast, a control system for halting the medium, the control system comprising first storage means operative to store an identifying number identifying a particular desired marker which is to be positioned, by appropriate movement of the recording medium along the said path, in a reference position in the path, counting means connected to the transducer means to count each electric signal produced by the transducer means, second storage means for storing a predetermined number, means connecting the second storage means to the counting means and operative when an identifying number has been stored in the first storage means to add the predetermined number to the counting means, comparing means connected to the counting means and the first storage means and operative to compare the instantaneous count of the counting means with the said identifying number in the first storage means whereby to produce a control signal when the instantaneous count corresponds to the identifying number, the control means being operative immediately the control signal occurs to produce a transport mechanism speed reducing signal and being operative when the number of electrical signals produced after the occurrence of the said control signal becomes equal to said predetermined number to produce a transport mechanism arresting signal, and manually settable switch means operative to set the predetermined number in the second storage means in accordance with the frequency, per unit length of the medium, of the said longitudinally arranged areas.

BRIEF DESCRIPTION OF THE DRAWINGS

Apparatus embodying the invention for controlling the movement of microfilm will now be described by way of example only, reference being made to the accompanying drawings in which.

Figure 1:
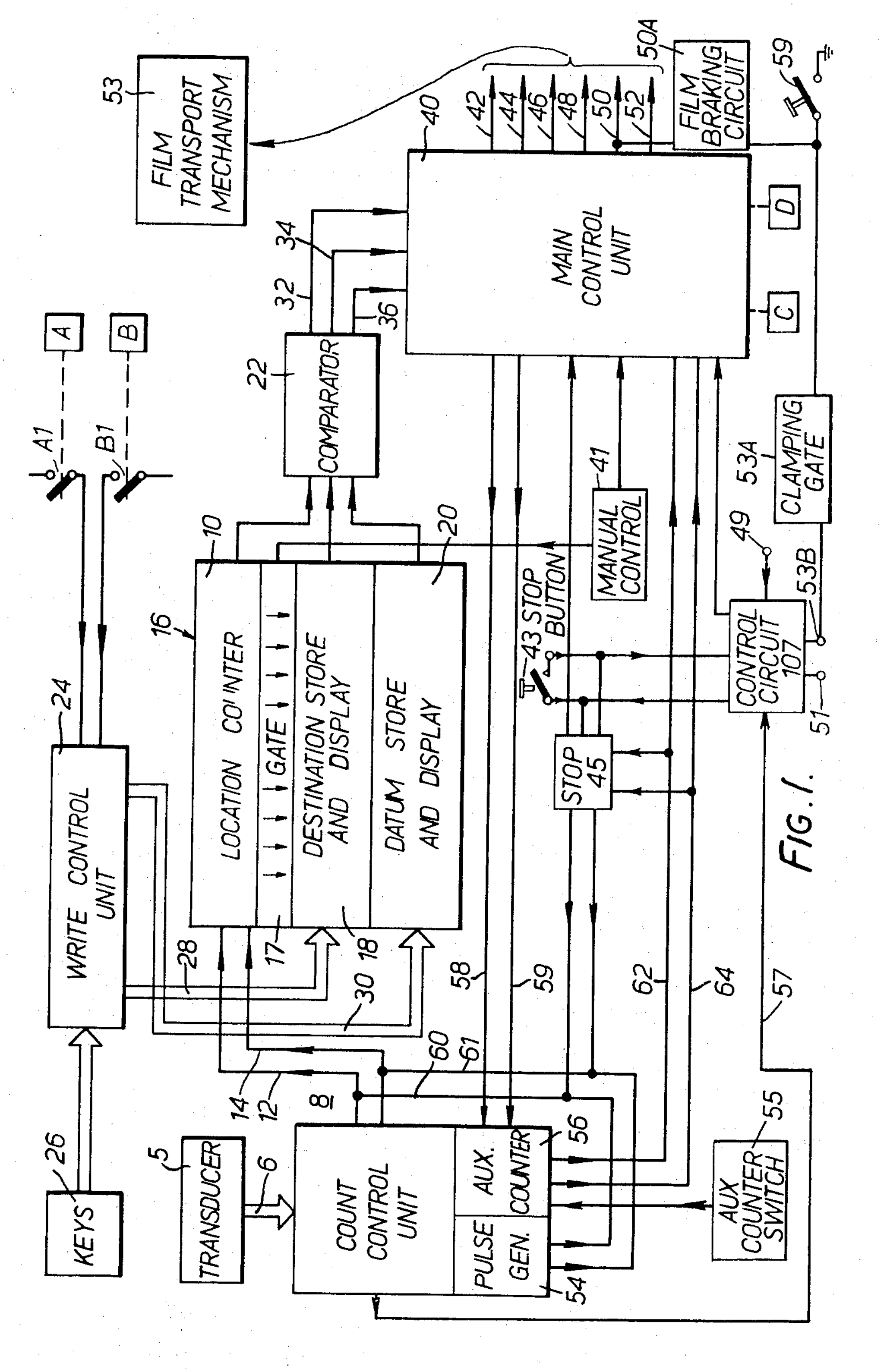
FIG. 1 is a block circuit diagram of the apparatus.

An item in any Figure of the drawings which corresponds to an item in any other Figure is similarly referenced.

DESCRIPTION OF THE PREFERRED EMBODIMENTS

Detailed Description

In the drawings, a number of switches references A, B, C, D, E, F and G are shown and the sets of contacts operated by each switch are indicated by the appropriate letter followed by a serial number. Unless otherwise shown on the drawings, one contact of each set is assumed to be connected to a power supply so that closure of the set energises the other contact. The switches A to G may comprise relays interlocked to ensure correct sequence of operation.

The apparatus to be described is for controlling the movement of microfilm in strip form; that is, the microfilm comprises a film strip having a plurality of visual images or frames thereon, arranged end-to-end. In use, the microfilm is driven by film transport mechanism from one spool to another under control of the apparatus to be described so as to present any particular desired frame into a control or viewing position where, by optical or other means, it is projected in magnified form on to a viewing screen for an operator's attention and/or is photographed of other-wise reproduced. The apparatus to be described enables any particular frame on the microfilm to be searched for and presented at the viewing position.

General Description

In accordance with the invention a respective marker is located on the microfilm alongside each frame, and in use the microfilm is driven along a path which passes between a light source and a photoelectric transducer 5 (FIG. 1), the latter being located at the control or viewing position. Each marker is substantially opaque to the light, and the photoelectric transducer 5 therefore produces a first signal (a "light-to-dark" signal) as each marker moves into position in front of the transducer and a second signal (a "dark-to-light" signal) as the film movement carries the marker away from the transducer. These two signals are fed by a channel 6 to a count control unit 8 which is arranged to suppress all the second signals, and feed each of the first signals into a location counter 10 by means of lines 12 and 14, the location counter forming part of a counter and store unit 16.

The unit 16 also includes two stores 18 and 20 and a comparing unit 22. The store 18 is linked to the location counter through a gate 17 and when the gate is closed is arranged to store a number, referred to as a destination number, representing the frame number of the desired frame. The store 20 is arranged to store a number, referred to as the datum number, representing the frame number of the frame initially located in correspondence with the transducer 5 before film movement begins. The destination and datum numbers are written into the stores 18 and 20 by the operator using a write control unit 24 and a set of digit keys 26.

The set of keys 26 comprises ten keys numbered 0 to 9 which are used in conjunction with two switches A and B. Switch B is operated when the datum number is to be written into the store 20 and closes contacts B1. The operator then oeprates the appropriate keys, in a manner to be explained, to write the datum number into the store 20 by means of a channel 30. During this writing operation, the marker of the frame whose number is being written into the store as the datum number must be accurately located in correspondence with the transducer 5. Switch B is then released and switch A is operated to close contacts A1. The keys are then again operated to write the destination number into the store 18 by means of a channel 28. Each of the stores 18 and 20 has a respective display associated with it so that the operator can ascertain that each number is correctly written into the store.

The comparator 22 is arranged to compare, continuously, (decade by decade) the numbers respectively held in the counter 10, the store 18, and the store 20. The comparator 22 has three output lines 32, 34 and 36, which are connected to a main control unit 40. The unit 40 is controlled by two switches C and D and has six output lines 42 to 52 which are connected to control the operation of the film transport mechanism 53. Switch C is termed the "locate destination" switch and is operated when it is desired to cause the apparatus to locate a particular frame represented by the destination number written into the store 18. Switch D is termed "locate datum" switch and is operated, after a desired frame has been located, when it is desired to cause film to revert to its original position. A signal on line 42 causes the film transport mechanism to drive the film forward. A signal on line 44 causes the transport mechanism to drive the film in the reverse direction. The line 46 controls the speed of movement: when a signal is present on the line 46, the transport mechanism runs slowly in a direction determined by the one of the lines 42 and 44 which is energised; when line 46 is not energised, the transport mechanism runs at high speed in the direction determined by the one of the lines 42 and 44 which is energised. When line 48 is energised the transport mechanism is stopped in a "standby" condition. When line 50 is de-energised, a normally applied film braking arrangement 50A preventing movement of the transport mechanism is released.

Associated with the count control unit 8 is a pulse generator 54 and an auxiliary counter 56. The pulse generator 54 and auxiliary counter 56 are both connected to the main control unit 40 my means of lines 58 and 59 and, when activated by the main control unit, the counter 56 is caused to count up to a predetermined maximum count at which it halts. The pulse generator 54 is also connected to the counter 10 by means of lines 60 and 61 and produces pulses on these lines, as the counter 56 counts up, which pulses count up the counter 10 by the same amount. The counter 56 has two output lines 62 and 64. Line 62 is energised when the count of the counter 56 reaches the predetermined maximum, and line 64 is energised when the count of counter 56 is zero.

A stop button 43 is provided and when it is operated it energises a stop circuit 45 which feeds a signal to the main control unit 40. Upon receipt of the signal, the main control unit 40 blocks the input lines 32, 34 and 36 and the lines 62 and 64 so that no further pulses are received by the unit 40 and also energises the lines 48 and 50 respectively to halt the motor and energise the film braking 50A to brake the film. The stop circuit 45 at the same time causes the pulses stored in the auxiliary counter 56 to be fed (via lines 62 and 69, and 60 and 61) to the location counter 10 so that the location counter will indicate the true location at which the film has been stopped. As will be explained later, in operation the true location of the film and the location indicated by the location counter normally differ by a number equal to that stored in the auxiliary counter.

An inductor 105 (see FIG. 2) is provided to sense the passage of a metallised tape at the end of the film. In the event of the film being overrun the inductor 105 senses the tape and provides an output signal which is amplified by the amplifier 108 and fed along line 49 to a control circuit 107 (FIG. 1). The control circuit 107 immediately short circuits the stop button 43 and thereby effects operation of the stop circuit 45 to halt the film in the manner previously described. The control circuit 107 includes a three input AND gate (not shown) which receives inputs from the line 49 as well as lines 51 and 53. Line 51 is connected to a manual control 41 (to be described in more detail herein after) and is energised when the manual control 41 is inoperative. Line 53B is connected to a film frame clamping gate 53A which is made to clamp the film automatically each time that the film is halted. Line 53B is energised only when the clamping gate 53A clamps the film. Thus when, and only when, all three lines 49, 51 and 53B are energised the control circuit 107 will send a further signal to the main control unit 40 to cause the film to be reversed back past the metallised strip to the last film frame. Thereupon a signal from the count control unit 8 - in response to the transducer 5 sensing the passage of the marker associated with the last film frame — is fed along line 57 to cause the control circuit 107 to discontinue the reverse drive signal to the main control unit 40. The apparatus thereby resumes a state in which it can receive further instructions via the keys 26.

A manual control unit 41 is provided. The manual control unit can be operated to drive the film independently of the keys 26 and also vary the speed of the drive so as to advance the film at will in order to observe successive frames of the film when searching for a particular frame whose location is unknown. The manual control unit can drive the film at speeds varying from very slow — at which speed each frame can be individually observed — to fast — being the same speed as that at which the main control unit normally drives the film.

When the manual control unit 41 is operated it also opens the gate 17 between the location counter 10 and the destination store 18.

The operator operates the keys 26 to write into the stores 18 and 20 the appropriate destination and datum numbers as explained. As the datum number is written into the store 20, a similar number is automatically written into the location counter by means to be described (since the number of the frame located in correspondence with the phototransducer 5 at this stage is the same as the datum number). The operator then operates the switch C whereupon the main control unit 40 energises the pulse generator 54 by means of a signal on line 58. Counter 56 is therefore counted up from zero to its maximum and increases the count in counter 10 by a corresponding amount. When the count of counter 56 has reached its maximum, line 62 is energised and causes the main control unit 40 to energise line 42. The film transport mechanism therefore drives the film in the forward direction at high speed past the transducer 5. As each frame moves past the transducer, the resultant pulse from unit 8 is fed to the unit 16 on lines 12 and 14 and counts up the location counter 10 by one. It will be appreciated that the count in the counter 10 is continuously in excess of the number of the frame passing the transducer 5 at any time, the amount of the excess being equal to the maximum count of the counter 56.

The comparator 22 continuously compares the numbers in the counter 10, the store 18, and the store 20, and energises line 34 when the number in the location counter 10 becomes equal to the destination number. Thereupon, the main control unit 40 energises the line 46 so as to reduce the speed of the film transport mechanism. At the same time, the unit 40 energises line 59 so that, as the film continues to move past the transducer 5, the pulses produced thereby are now fed into the counter 56 instead of the counter 10, and count down the counter 56. When the counter 56 reaches a count of zero, line 64 is energised whereupon the unit 40 energises line 48 and stops the film transport mechanism. It will be seen that the number of the frame now located in correspondence with the transducer 5, and thus in the viewing position, is the same as the destination number, since the effect of the addition made to the number in the counter 10 at the beginning of the operation (by feeding in the pulses produced by counting up the counter 56) has been offset by the counting down of the counter 56 at the end of the operation. The use of the counter 56 enables the main control unit to slow down the film transport mechanism before the desired frame is reached and thus reduces or eliminates the possibility of overshoot. The maximum count of the counter 56 determines the instant at which the film speed is reduced, and this maximum count is selected so as to be just sufficient, taking into account the inertia of the transport mechanism and other factors, to prevent overshoot. An auxiliary counter switch 55 is provided to enable the maximum count of the counter 56 to be preset to a different value to take into account films having a smaller frame size and which therefore produce transducer pulses at a higher frequency for the same film speed. Preferably the cartridge housing the film with the smaller frame size has a projection which can operate the switch 55 automatically when the cartridge is mounted on the apparatus.

If the operator now wishes to locate another frame along the film, he re-operates switch A and writes into the store 18 the new destination number by means of the keys 26 and the write control unit 24. During this process, switch C is automatically switched off. At the completion of the writing process, the operator re-operates switch C and the apparatus then operates in a manner similar to that described above to locate the new desired frame, the counter 56 again being counted up initially, (before the film commences to move) and counted down again after the film speed has been reduced. It will be appreciated that the direction of film movement during such a searching operation depends on whether the new desired destination is further along the film from the previous destination or further behind. The line 32 is energised by the comparator 22 whenever the destination number is less than the number in the counter 10 and ensures that the film is driven in the correct direction.

When the operator wishes to rewind the film to the original position, he operates switch D (which automatically switches off the switch C). Switch D causes the main control unit 40 to energise the line 58 whereupon, in the manner described above, the pulse generator 54 causes the counter 56 to count up to its maximum count and to increase the count in the counter 10 by a corresponding amount. When counter 56 has reached its maximum, it energises line 62 whereupon the unit 40 energises line 44 to cause the transport mechanism to reverse the film at high speed. As before, the comparator 22 continuously compares the count of the counter 10 with the numbers stored in the stores 18 and 20 as the film moves past the transducer 5. When the count in the counter 10 becomes equal to the datum number in the store 20, line 36 is energised, whereupon unit 40 energises line 46 and reduces the speed of the film transport mechanism. At the same time, line 59 is energised and the pulses from the transducer head 5 are now fed into, and count down, the counter 56 instead of affecting the counter 10. When the count of the counter 56 reaches zero, line 64 is energised whereupon the unit 40 halts the transport mechanism by means of line 48. Thus the counter 56 has again operated to slow down the transport mechanism before the film reaches the desired position in order to prevent overrun.

Figure 2:
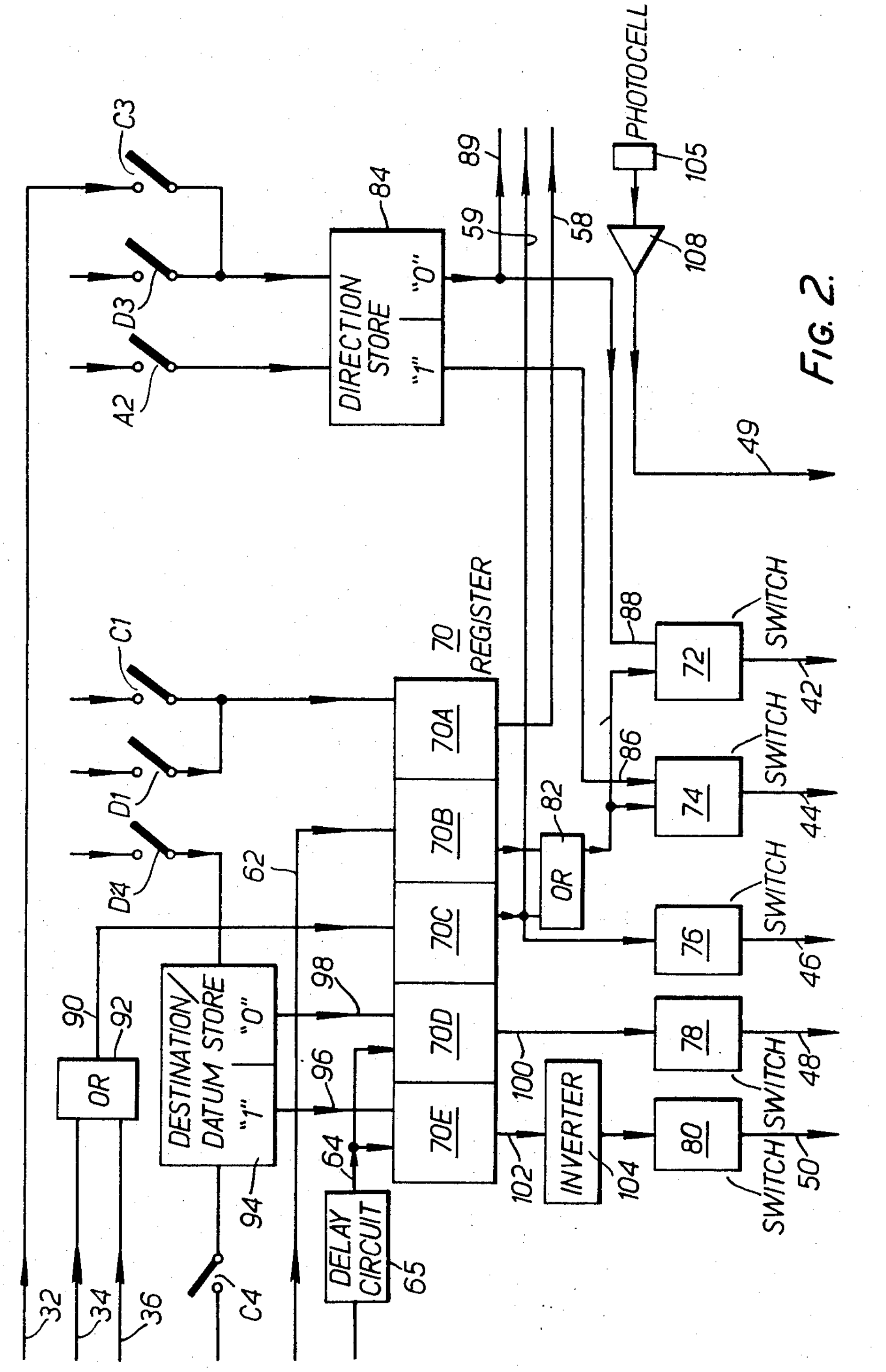
FIGS. 2, 3 and 4 are block diagrams of various parts of the apparatus illustrated in FIG. 1.

The apparatus will now be described in more detail with reference to FIGS. 2 to 4.

MAIN CONTROL UNIT

Description

The main control unit 40 (FIG. 2) comprises a five stage register 70 which controls the energisation of lines 42 to 50 by means of electronic switches or relays 72, 74, 76, 78 and 80. The register has five stages 70A to 70E and only one stage can be "ON" at any time. Register stage 70A is set ON by closure of contacts C1 or D1. When so set, stage 70A energises line 58 and causes counter 56 (FIG. 1) to be counted up by the pulse generator 54. Register stage 70B is set ON by energisation of line 62 which occurs when the counter 56 has reached its maximum count. When so set, stage 70B feeds on output through an OR gate 82 to switches 72 and 74. Swtiches 72 and 74 are controlled by a direction store 84 so that only one of them can be operative at any time. The direction store 84 comprises a bistable circuit which is arranged to produce an output on a line 86 when it is 1 state and an output on lines 88 and 89 when in its 0 state; the output on line 86 inhibits operation of switch 74 and the output on line 88 inhibits the operation of switch 72. Line 89 is connected to the count control unit 8. The store 84 is connected to be set into its 1 state through contacts A2 and to be set into its 0 state through contacts C3 and D3. Contacts C3 are supplied by means of the line 32 from the comparator 22 (FIG. 1) which line is energised when the destination number in the store 18 is less than the count of the counter 10.

Register stage 70C is set ON by means of a line 90 which is energised, through an OR gate 92, by either line 34 or line 36 from comparator 22 (FIG. 1). When so set, stage 70C supplies an output through OR gate 82 to switches 72 and 74 and also supplies a further output to switch 76 and to line 59.

Register stages 70D and 70E are set ON by means a signal from the counter 56 (FIG. 1) via line 64 and a delay circuit 65 under the control of a destination/datum store 94. The store 94 comprises a bistable unit which is set into its 1 state through contacts C4 and in this state it produces an output on a line 96 which inhibits setting of state 70E. The store 94 is set into the 0 state through contacts D4 and in this state it energises a line 98 which inhibits setting of stage 70D. Stage 70D produces an output on a line 100, when set ON, which energises switch 78. Stage 70E energises a line 102, when set ON, and this signal is passed through an inverter 104 to cause the switch 80 to de-energise the line 50 and thus apply a lock to the film transport mechanism.

The delay circuit 65 is so adjusted as to allow the leading edge of the selected marker to overrun the transducer by an amount related to the width of the marker and the predetermined speed of the film so that the film finally halts in the centre of the marker irrespective of the direction of film movement.

Operation

The datum and destination numbers are written into the stores 18 and 20 as explained in conjunction with FIG. 1; the closure of switch A while the destination number is being written into the store 18 causes the direction store 84 to be set into its 1 stable state through contacts A2. Switch C is then operated, and the resultant closure of contacts C1 causes register stage 70A to be set ON and line 58 to be energised so that the counter 56 (FIG. 1) counts up under control of the pulse generator 54 and thereby increases the count in the counter 10. Closure of switch C also sets the store 94 into the 1 state through contacts C4.

When the counter 56 (FIG. 1) has reached its maximum count, line 62 is energised and sets register stage 70B ON and thus operates switch 72 (switch 74 being inhibited by the direction store 84) to energise line 42 and thus to cause the film transport mechanism to drive the film forward at high speed.

When comparator 22 (FIG. 1) detects that the count of counter 10 is equal to the destination number, line 34 is energised and sets register 70C ON by means of line 90. Switch 76 is therefore operated to energise line 46, and thus to reduce the speed of the transport mechanism (although stage 70A is no longer ON, switch 72 is maintained operated by stage 70C); At the same time, line 59 is energised and, in the manner explained in conjunction with FIG. 1, causes the pulses from the transducer 5 to count down the counter 56.

When the counter 56 has been counted down to zero, line 64 (FIG. 1) is energised and sets register stage 70D ON, stage 70E being inhibited by line 96.

Line 100 therefore operates switch 78 and line 48 is energised to halt the film transport mechanism in the standby condition. Switches 76 and 72 are no longer operated since neither stage 70A nor stage 70C is now ON.

If the operator now wishes to proceed to locate another frame, he re-operates switch A (which automatically releases switch C) and writes the new destination number into the store 18. He then re-operates switch C, and the stage 70A of register 70 is once more set ON through contacts C1, and if the new desired frame is further along the film, the procedure described above is repeated. If, however, the new desired frame has a lower frame number, line 32 is energised by comparator 22 and sets the store 84 into the 0 state through contacts C3 when switch C is operated. Therefore, the switch 74 is operated when stage 70B goes ON, and the film runs in the reverse direction. The procedure is otherwise the same as described above. Energisation of line 89 by store 84 ensures that the pulses produced by the transducer 5 during the reverse film movement count down the counter 10.

If the operator wishes to rewind the film, he operates switch D, which automatically releases switch C. Closure of contacts D3 sets the direction store 84 into the 0 state, and closure of contacts D4 sets the destination/datum store 94 into the 0 state. Closure of contacts D1 sets the stage 70A ON and energises line 58 to cause the counter 56 (FIG. 1) to be counted up by the pulse generator 54 and thus to count up the counter 10. Stage 70B is then set ON so as to operate switch 74 (switch 72 being inhibited at this time by means of line 86), whereupon the film transport mechanism reverses the film at high speed. When the comparator 22 senses that the count of the counter 10 equals the datum number, line 36 is energised and sets the register stage 70C ON by means of line 90. Switch 76 is therefore operated to energise line 46 and thereby reduce the film speed; although stage 70B is no longer ON, switch 74 is maintained operated by stage 70C. At the same time, line 59 is energised and causes the pulses from the transducer 5 to count down the counter 56. When the counter 56 has been counted down to zero, indicating that the film has reached the datum position, line 64 is energised and sets stage 70E into the ON state (stage 70D being inhibited by line 98). Line 102 is therefore energised so as to de-energise line 50 and to release the film cassette.

COUNT CONTROL UNIT

Description

The count control unit will now be described with reference to FIG. 3.

The light-to-dark and dark-to-light pulses from the transducer 5 are fed to an amplifier and shaper unit 150 (FIG. 3) and thence to a gate 152, which, according to its setting, allows either the light-to-dark pulses or the dark-to-light pulses to pass; when the film is a positive film, the gate allows the light-to-dark pulses only to pass but if the film is a negative one it can be set to allow only the dark-to-light pulses to pass by means of a control signal on either a line 154 or a line 155. The pulses from the gate 152 pass into a double pulse generator 156 which produces two pulses, on lines 158 and 160 respectively, for each single pulse received. Lines 158 and 160 are both connected to a normally on gate 162 and a normally off gate 164. Gate 162 is connected through an amplifier 166 to lines 12 and 14 (see FIG. 1) leading to the location counter 10. Gate 162 is switched off when the line 59 (see FIGS. 1 and 2) is energised at the time when the film transport mechanism is slowed down. When the line 89 is energised from the main control unit (see FIG. 2) during reversal of the film, the gate 162 is caused to invert each double pulse from the double pulse generator 156 so that the counter 10 is counted down instead of up. The location counter may comprise a decatron counter and thus one of these double pulses serves as a routing pulse, indicating the direction of count, while the other serves as a counting pulse. The output from gate 164 is fed through an amplifier 168 to the counter 56 which comprises two decatron decades 56A and 56B connected together by a coupling stage 56C. The second decade 56B produces an output on the line 62 when it is set in its maximum count setting, and produces a further output on a line 170 when it is in its zero count setting. The line 170, together with a further line 172 carrying the pulses from the transducer 5, supply an AND gate 174 whose output line is the line 64 of FIGS. 1 and 2. When line 58 is energised at the beginning of each frame searching operation, gate 614 is switched on and the double pulses pass through it to count up the counter 56. When line 59 is energised at the time when the film transport mechanism is slowed down, gate 164 is switched on but is arranged to invert the double pulses so that the counter 56 is counted down.

Figure 3:
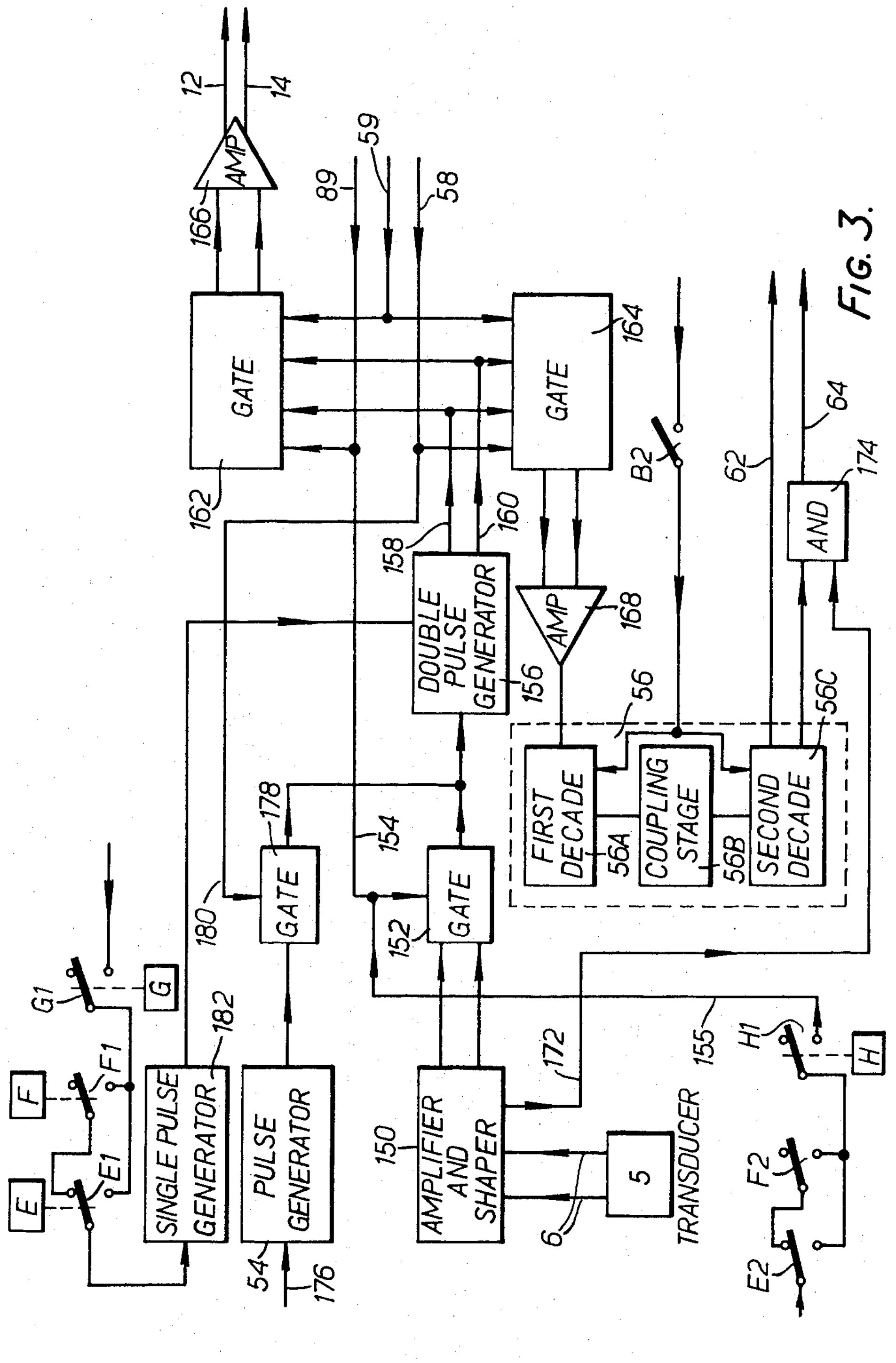
Figure 4:
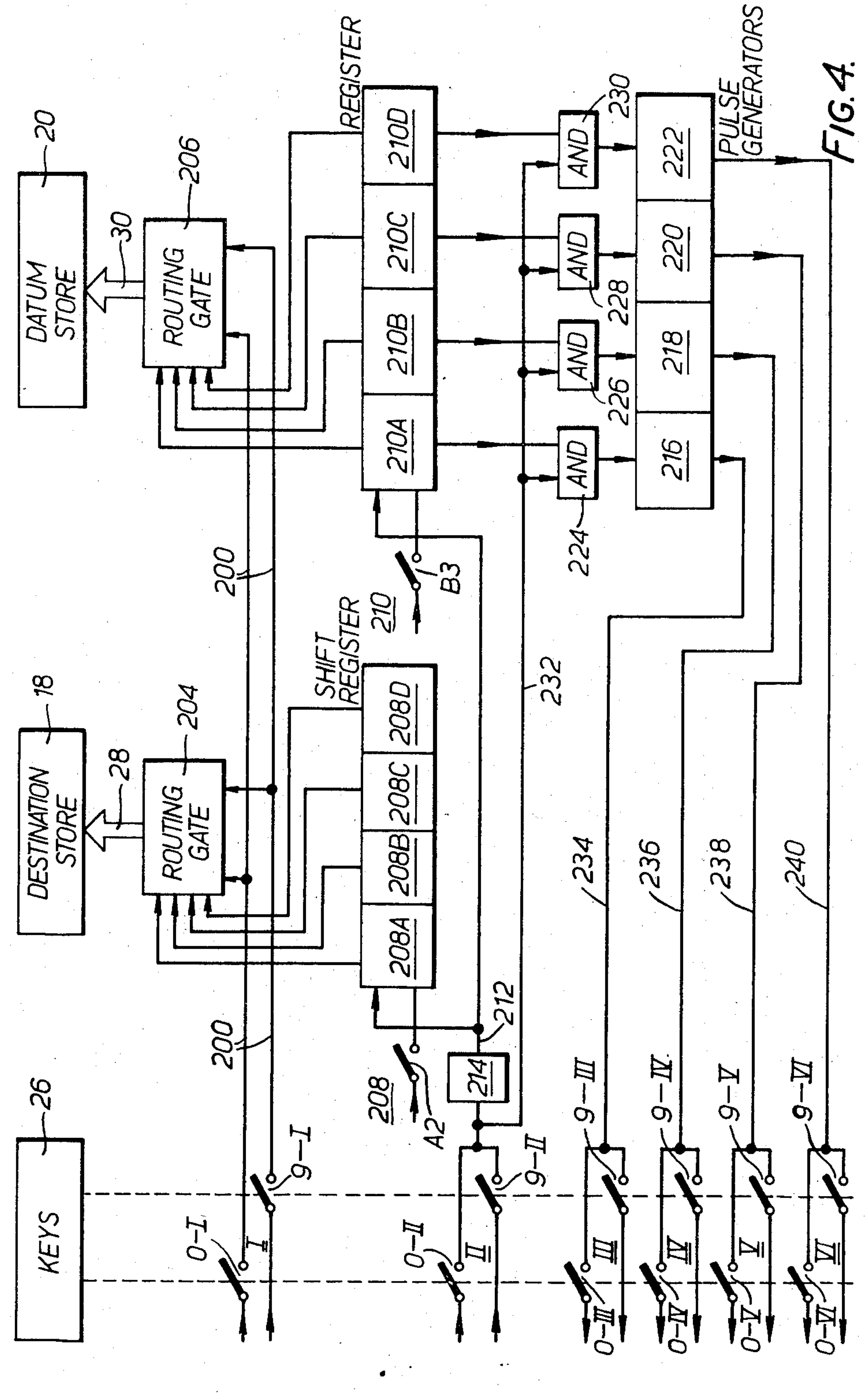

The pulse generator 54 (see also FIG. 1) is energised from the 50 c/s mains supply by means of a line 176 as shown in FIG. 3. The output of the pulse generator 54 is connected to a normally off gate 178. The gate is switched on by means of the line 180 which is connected to be energised by the line 58, and the pulses which then pass through the gate are fed into the double pulse generator 156.

The count control unit also includes a single pulse generator 182 which can be energised through contacts E1, F1, and G1 which are respectively closed by operation of switches E, F, and G. Contacts E2 and F1, together with contacts H1 of a switch H, control the energisation of line 155.

OPERATION

When the operator initiates a searching operation (after inserting the destination and datum numbers into the stores 18 and 20) by operating switch C, the line 58 is energised from the main control unit and the gate 164 is thereby switched on. At the same time, line 180 switches on gate 178 and the pulses from the pulse generator 54 pass through the gate 178. The resultant double pulses from the double pulse generator 156 are fed, by means of lines 158 and 160 and gates 162 and 164, to the location counter 10 (FIG. 1) and the auxiliary counter 56. When the counter 56 reaches its maximum count, line 62 is energised and, as explained above in connection with FIG. 2, stage 70B of the control register 70 is set ON and the film transport mechanism commences to run. Line 58 is de-energised thus closing the gates 164 and 178. The pulses produced by the transducer 5, as the film moves therepast, pass into gate 152 which, because line 152 is not energised, only allows the light-to-dark pulses to pass. These pulses activate the double pulse generator 156 whose output pulses pass through gate 162 to the counter 10.

When the comparator 22 (FIG. 1) detects that the count of counter 10 equals the destination number, the speed of the film transport mechanism is reduced. At the same time, line 59 is energised which switches off the gate 162 and switches the gate 164 into its inverting mode of operation. The pulses now produced by the transducer 5 cause the counter 56 to count down. When the counter reaches zero count, line 170 is energised so that the next pulse from the transducer 5 energises line 64 to halt the film as explained in connection with FIG. 2. The film will be halted substantially simultaneously with the occurrence, on line 172, of the first pulse after AND gate 174 has been enabled by the energisation of line 170. This pulse on line 172 is the light-to-dark pulse produced as the marker associated with the desired film frame moves into position in front of the transducer; therefore, the film is halted with the marker in front of the transducer.

When the operator wishes to re-wind the film to the datum position, he operates switch D (FIGS. 1 and 2) and the film commences to reverse (after counter 56 has been counted up). Operation of switch D energises line 89 (see FIG. 2) so that the gate 162 is switched into its inverting mode and the pulses fed into it cause the counter 10 to count down. Since the next pulse produced is a dark-to-light pulse produces at the beginning of this reverse film movement (by the marker previously stationary at the transducer 5) and dark-to-light pulses are suppressed, the counter 10 will not commence counting down until the next marker affects the transducer 5. It will be appreciated that the width of the marker pulse is such that no matter which direction the film is driven, the small overrun which occurs when the film is halted in response to the leading edge of the marker being sensed will result in the centre of the marker being in alignment with the transducer.

Switches E to H enable the count of counter 10 to be altered manually to correct errors.

The write control unit 24 (FIG. 1) will now be described in detail with reference to FIG. 4.

The write control unit is controlled by the digit keys 26. There are 10 such keys, one for each of the digits 0 to 9, and each key controls six contacts. The contacts are arranged in six banks referenced I, II, III, IV, V and VI. Thus, operation of the 0 digit key closes contacts O-I, O-II, O-III, O-IV, O-V and O-VI. Similarly, operation of the 9 digit key closes contacts 9-I, 9-II, 9-III, 9-IV, 9-V and 9-VI. The other digit keys 1 to 8 and their contacts are omitted from FIG. 4 to aid clarity. The 10 sets of contacts in the bank I are respectively connected by lines 200 to the inputs of a routing gate 204 and a routing gate 206. The gate 204 routes writing signals from the contacts to the correct storage locations in the destination store 18 by means of the channel 28 in a manner to be explained. Similarly, the gate 206 routes writing signals to the correct storage locations in the datum store 20 by means of the channel 30.

A shift register 208 is associated with the gate 204 and has four stages 208A, 208B, 208C and 208D. The four stages correspond to the four decades of each destination number, stage 208A corresponding with the highest decade. The register is set into the condition in which stage 208A is ON by means of contacts A2 operated by switch A.

A register 210 is associated with the gate 206 and has four stages 210A, 210B, 210C and 210D, corresponding with the four decades of the datum number, the register being set into the state in which stage 210A is ON by means of contacts B3 operated by switch B.

Shift signals are supplied to the two registers by means of a line 212 which is energised by a pulse generator 214. The latter is energised by closure of any of the contacts in bank II.

The register 210 also controls four pulse generators 216, 218, 220 and 222 which, in a manner to be explained, ensure that during the initial setting up of a datum number, the datum number is written into the counter 10 (FIG. 1) as well as the datum store 20. Each stage of the register 210 is connected to a respective one of the pulse generators 216 to 222 by means of a respective AND gate 224 to 230. The AND gates are connected to the bank II of contacts by means of a line 232 so that the AND gates are enabled whenever one of the keys is connected to a respective one of the banks III to VI of contacts by means of a respective line 234 to 240.

OPERATION

When the destination number is to be written into the destination store 18, the operator closes switch A so that stage 208A of register 208 is set ON by contacts A2. The operator then depresses the appropriate one of the digit keys according to the particular digit in the highest decade of the destination number, and a signal on the appropriate one of the lines 200 is directed by the routing gate 204, which is at this time operating under control of stage 208A, to the appropriate location in the store 18. Release of the digit key also closes the appropriate contacts in the bank II and thus causes a shift pulse to be produced on line 212 which now switches on stage 208B of the register. The operator now releases the digit key previously set, and sets one of the keys according to the particular digit in the next lower decade of the destination number. The resulting signal on one of the lines 200 is now routed by the gate 204, which is now operating under control of stage 208B, to the appropriate location in the destination store 18. In the same way, the remaining decades of the destination number are set into the store 18.

During the setting up of the destination number, register 210 is inoperative because contacts B3 are open, and therefore the closure of any of the contacts in the bank A has no effect on the gate 206. For the same reason, the pulse generators 216 to 222 are inoperative.

When the datum number is to be set into the store 20, switch A is released and switch B is operated. Register 208 therefore becomes inoperative and register 210 is rendered operative with stage 210A set ON. The operator now operates the keys four times, in a similar fashion to that described above, to set the datum number into the store 20 decade by decade. As each decade is set up, an appropriate one of the pulse generators 216 to 232 is pulsed by the particular stage of the register 210 which is ON and produces a pulse which is fed on the corresponding one of the lines 234 to 240. Thus, when the digit representing the highest decade of the datum number is being set into the store 20, a pulse is produced on line 234. This pulse is routed by the particular one of the contacts in the bank III which is closed at this time to set the highest decade of the location counter 10 to the same number. Similarly, when the digit corresponding to the next lower decade of the datum number is being set into the store 20, a pulse is produced on line 236 and this pulse is routed by the particular one of the contacts IV which is closed at this time to set the next lower decade of the location counter 10. In this way, the location counter 10 is set to the same number as the store 20.

THE FILM DRIVE ARRANGEMENT

The microfilm is preferably housed in a cassette having two spools and arranged so that the film can be transferred between the two spools. Each spool is arranged to engage a corresponding drive spindle mounted in the apparatus. The direction of drive of the film can be reversed by selectively driving one or other of the two spools through a common motor. Electromagnetically operated brakes of the electromagnetic film breaking circuit 48A are arranged to cooperate with each spindle so that when the drive to the spools ceases, any movement of the film due to inertia of the spools is halted.

The clamping gate 53A is pivotally supported and arranged to clamp the portion of the film between the two spools against a locating frame support so as to hold a frame of the film steady for projection. The clamping gate 53A is electromagentically operated when movement of the film is halted.

A pair of film guide rollers lying on opposite sides of the locating frame support are mounted on a pivotal support. The pivotal support is normally urged by electromagnetic means in a sense so that the rollers hold the film close to the locating frame support but when released will pivot in a sense to allow greater freedom of movement of the film so that it can readily be withdrawn from the apparatus.

When mounted on the apparatus the cassette is arranged to engage a microswitch 59 and close the contacts of the microswitch. The contacts of the microswitch 59 are in the earth part of the electrical circuits controlling the brakes, the pivotal support and the clamping gate. In the condition when the film is stationary, the brakes are normally on and both the pivotal support and the clamping gate normally constrain the film towards the locating frame support. If now in this condition the cassette is raised slightly away from the apparatus the microswitch 59 becomes disengaged. Disengagement of the microswitch releases the brakes the clamping gate and the pivotal support to provide ample freedom of movement for the cassette and film to be readily withdrawn from the apparatus.

GENERAL

If the film base is positive (that is, opaque) instead of negative (that is, transparent), then the frame markers will be clear instead of opaque, and many other modifications can be made to the apparatus decribed without departing from the scope of the invention.

I claim:

1. In apparatus having a transport mechanism for driving, along a predetermined path, a longitudinally movable recording medium having a plurality of longitudinally arranged areas in which information can be recorded and a respective marker associated with each area, and transducer means arranged to produce a respective electrical signal in response to the movement of each marker therepast, each electrical signal comprising first and second time-displaced portions respectively produced by longitudinally-spaced regions of each marker, a control system comprising storage means operative to store an identifying number identifying a particular desired marker which is to be positioned, by appropriate movement of the recording medium along the said path, in a reference position in the path, counting means connected to the transducer means to count the leading said portion only of each electrical signal produced by the transducer means according to the direction of movement of the film, comparing means connected to the counting means and the storage means and operative to compare the instantaneous count of the counting means with the said identifying number in the storage means whereby to produce a control signal when the instantaneous count corresponds with the identifying number, control means responsive to the control signal to produce a transport mechanism arresting signal when the leading portion of the particular desired marker is sensed by the counting means, and delay means for delaying the application of the transport mechanism arresting signal to the transport mechanism by a period related to the width of the marker and the speed of the medium whereby to halt the medium in a position in which the transducer means lies midway between the two portions of the selected marker and which position corresponds to said reference position.

2. Apparatus according to claim 1, including means operative to add a predetermined number to the count of the counting means so that, as the recording medium moves along the said path, the instantaneous count of the counting means is in excess, by the amount of the said pre-determined number, of the number of electrical signals counted, the said control means comprising first means operative immediately the control signal occurs to produce a transport mechanism speed reducing signal, and second means operative to produce the said transport mechanism arresting signal when the number of electrical signals produced by the transducing means after occurrence of the said control signal becomes equal to the said predetermined number.

3. In apparatus having a transport mechanism for driving, along a predetermined path, a longitudinally movable recording medium having a plurality of longitudinally arranged areas in which information can be recorded and a respective marker associated with each area, and transducer means adjacent the said path and producing a respective electrical signal in response to the movement of each marker therepast, a control system for halting the medium, the control system comprising first storage means operative to store an identifying number identifying a particular desired marker which is to be positioned, by appropriate movement of the recording medium along the said path, in a reference position in the path, counting means connected to the transducer means to count each electric signal produced by the transducer means, second storage means for storing a predetermined number means connecting the second storage means to the counting means and operative when an identifying number has been stored in the first storage means to add the predetermined number to the counting means, comparing means connected to the counting means and the first storage means and operative to compare the instantaneous count of the counting means with the said identifying number in the first storage means whereby to produce a control signal when the instantaneous count corresponds to the identifying member, the control means being operative immediately the control signal occurs to produce a transport mechanism speed reducing signal and being operative when the number of electrical signals produced after the occurrence of the said control signal becomes equal to said predetermined number to produce a transport mechanism arresting signal, and manually settable switch means operative to set the predetermined number in the second storage means in accordance with the frequency, per unit length of the medium, of the said longitudinally arranged areas.

4. Apparatus according to claim 1, including an electromagnetically operable brake connected to the control means and responsive to the transport mechanism arresting signal to halt the transport mechanism driving the film, an electromagnetically operable clamping arrangement connected to the control means and responsive to the halting of the film to clamp the medium immediately around the area associated with the desired marker, and switch means in circuit with the electromagnetically operable brake and the clamping arrangement and responsive to the withdrawal of a housing, housing the medium, from the transport mechanism to release the brake and the clamping arrangement to allow the medium to be readily removed from the transport mechanism.

5. Apparatus according to claim 3, including an electromagnetically operable brake connected to the control means and responsive to the transport mechanism arresting signal to halt the transport mechanism driving the film, an electromagnetically oeprable clamping arrangement connected to the control means and responsive to the halting of the film to clamp the medium immediately around the area associated with the desired marker, and switch means in circuit with the electromagnetically operable brake and the clamping arrangement and responsive to the withdrawal of a housing, housing the medium, from the transport mechanism to release the brake and the clamping arrangement to allow the medium to be readily removed from the transport mechanism.

6. Apparatus according to claim 4, wherein said control means includes manually operable stop means which when operated actuates the electromagnetically operable brake to halt the medium immediately.

7. Apparatus according to claim 6, wherein the control means includes an inductor responsive to the passage there-past of metallised members located at opposite end portions of the medium, said inductor being connected to the stop means to actuate the stop means when a said metallised member is sensed.

8. Apparatus according to claim 7 wherein the control means includes first means connected to the indoctor and responsive to the inductor sensing a said metallised member to reverse the drive of the transport mechanism after the medium has been halted, and second means connected to the transducer and responsive to the transducer sensing the first marker beyond the said metallised member after the reversal of the drive of the transport mechanism to actuate the stop means to halt the medium.

9. Apparatus according to claim 5, wherein said control means includes manually operable stop means which when operated actuates the electromagnetically operable brake to halt the medium immediately.

10. Apparatus according to claim 9, wherein the control means includes an inductor responsive to the passage there-past of metallised members located at opposite end portions of the medium, said inductor being connected to the stop means to actuate the stop means when a said metallised member is sensed.

11. Apparatus according to claim 10, wherein the control means includes first means connected to the inductor and responsive to the inductor sensing a said metallised member to reverse the drive of the transport mechanism after the medium has been halted, and second means connected to the transducer and responsive to the transducer sensing the first marker beyond the said metallised member after the reversal of the drive of the transport mechanism to actuate the stop means to halt the medium.

* * * * *